US012365299B2

(12) United States Patent
Rios

(10) Patent No.: US 12,365,299 B2
(45) Date of Patent: Jul. 22, 2025

(54) MODULAR PUBLIC SAFETY VEHICLE SECURITY PARTITION

(71) Applicant: Westin Automotive Products, Inc., San Dimas, CA (US)

(72) Inventor: Carlos Rios, Mira Loma, CA (US)

(73) Assignee: Westin Automotive Products, Inc., San Dimas, CA (US)

( * ) Notice: Subject to any disclaimer, the term of this patent is extended or adjusted under 35 U.S.C. 154(b) by 300 days.

(21) Appl. No.: 17/889,675

(22) Filed: Aug. 17, 2022

(65) Prior Publication Data

US 2023/0054989 A1 Feb. 23, 2023

Related U.S. Application Data

(60) Provisional application No. 63/234,017, filed on Aug. 17, 2021.

(51) Int. Cl.
*B60R 21/12* (2006.01)
(52) U.S. Cl.
CPC .................................... *B60R 21/12* (2013.01)
(58) Field of Classification Search
USPC ............... 296/24.42, 24.43, 24.46, 85, 83
See application file for complete search history.

(56) References Cited

U.S. PATENT DOCUMENTS

| | | | | |
|---|---|---|---|---|
| 3,397,005 A | * | 8/1968 | May | B60R 21/12 296/24.46 |
| 4,173,369 A | * | 11/1979 | Roggin | B60R 21/12 296/24.46 |
| 5,536,057 A | * | 7/1996 | Stewart | B60R 21/12 296/37.16 |
| 6,250,700 B1 | * | 6/2001 | Traxler | B60N 2/24 410/135 |
| 6,669,259 B2 | * | 12/2003 | Murray | B60R 21/026 296/24.46 |

(Continued)

FOREIGN PATENT DOCUMENTS

DE 4416456 C1 * 9/1995 ........... B60R 21/026

OTHER PUBLICATIONS

Translation of DE 4416456 (Year: 1994).*

*Primary Examiner* — Amy R Weisberg
*Assistant Examiner* — Veronica M Condo
(74) *Attorney, Agent, or Firm* — The Dobrusin Law Firm, PC

(57) ABSTRACT

The present invention provides a modular security partition for a public safety vehicle comprising: a driver assembly, a passenger assembly, and a frame connect assembly, wherein the driver assembly having at least one driver panel, and a driver frame member having a non-feature portion, and a driver connect feature that is a part of the frame connect assembly; the passenger assembly having at least one passenger panel, and a passenger frame member having a non-feature portion, and a passenger connect feature that is a part of the frame connect assembly; the driver assembly and the passenger assembly are separate pieces designed for easy shipping; and the driver assembly and the passenger assembly are then assembled together into the security partition as a single piece by using the frame connect assembly, fasteners, and the assembly attachment features of the at least one driver panel and the at least one passenger panel.

18 Claims, 16 Drawing Sheets

(56) References Cited

U.S. PATENT DOCUMENTS

| | | | | |
|---|---|---|---|---|
| 7,806,452 B2* | 10/2010 | Storer | ............... | B60R 21/12 |
| | | | | 280/749 |
| 8,690,216 B2* | 4/2014 | Sage | ............... | B60R 21/12 |
| | | | | 296/24.42 |
| 8,708,388 B2* | 4/2014 | Setina | ............... | B62D 27/00 |
| | | | | 280/749 |
| 10,640,069 B2* | 5/2020 | Gardner | ............... | B60R 21/12 |
| 11,135,989 B2* | 10/2021 | Reynolds | ............... | B60R 21/12 |
| 2003/0090118 A1* | 5/2003 | Murray | ............... | B60R 21/026 |
| | | | | 296/24.4 |
| 2019/0023211 A1* | 1/2019 | Rios | ............... | B60R 21/12 |

\* cited by examiner

MODULAR PUBLIC SAFETY VEHICLE SECURITY PARTITION

CLAIM OF BENEFIT OF FILING DATE

This application claims the benefit of the filing date of U.S. Provisional Application Ser. No. 63/234,017 titled: "Modular Public Safety Vehicle Security Partition" filed on Aug. 17, 2021, which is incorporated herein by reference for all purposes.

FIELD OF INVENTION

The present invention relates to vehicle accessory field. More specifically, it relates to a modular security partition for use in public safety vehicles to form a barrier between the front and rear occupant area.

BACKGROUND OF INVENTION

Many public vehicles, especially taxis and police cars use a security partition to form a physical barrier between the front and rear occupant areas in order to prevent access to the front occupant area from the rear occupant area. A conventional security partition basically includes one or more panels attached (e.g., welded or bolted) to a frame structure that spans the interior width of a vehicle. See e.g., https://setina.com/partitions/. Shipping such a security partition is expensive due to its large size especially since the top/horizontal portion of the frame structure is usually a single non-collapsible member that spans the interior width of a vehicle, and the entire security partition is usually shipped to customers in an assembled fashion (e.g., in one piece with most, if not all, of the panels already attached to the frame structure). See e.g., https://setina.com/partitions/. To reduce shipping costs, it would be desirable to have a security partition that can be shipped in a more collapsible manner.

BRIEF DESCRIPTION OF THE DRAWING

The present invention will be more clearly understood when considering the accompanying drawing of which.

DESCRIPTION OF THE PREFERRED EMBODIMENT

Figure 3:
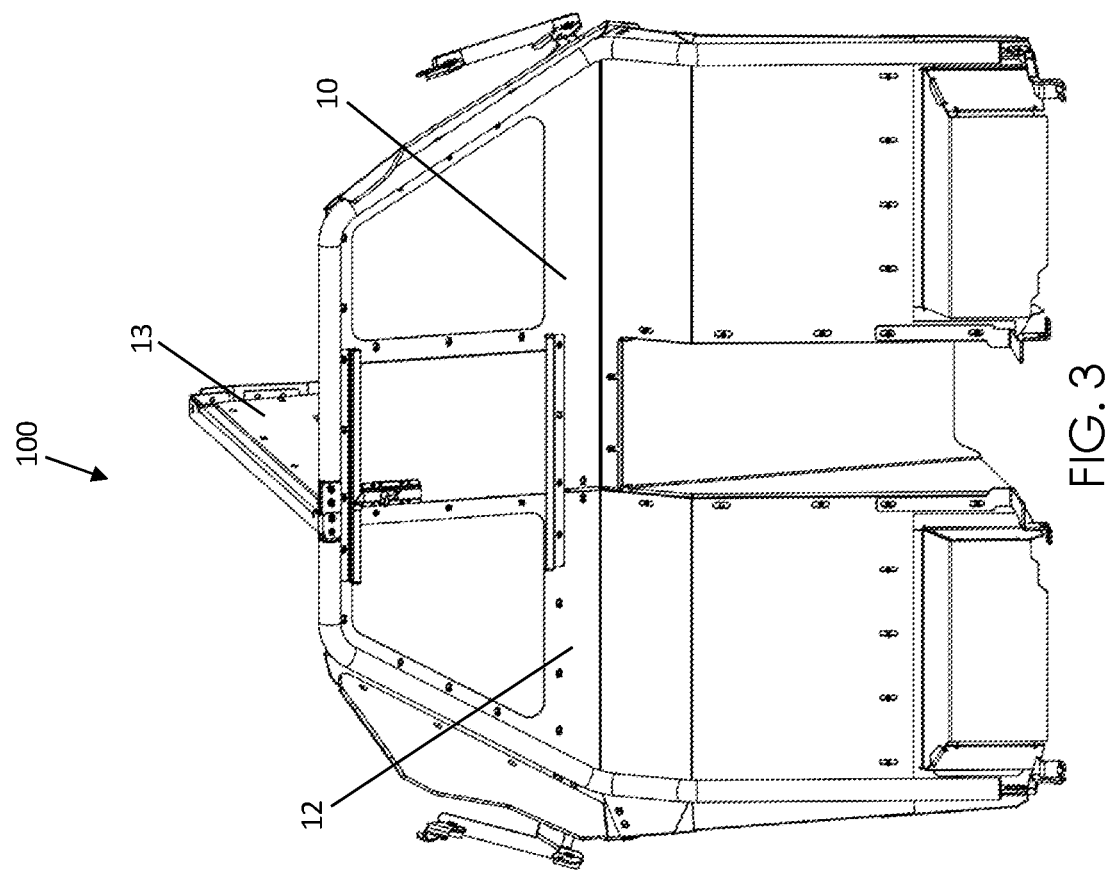
FIG. 3 shows a front perspective view of the partition of FIG. 1 with an optional passenger divider.
Figure 4:
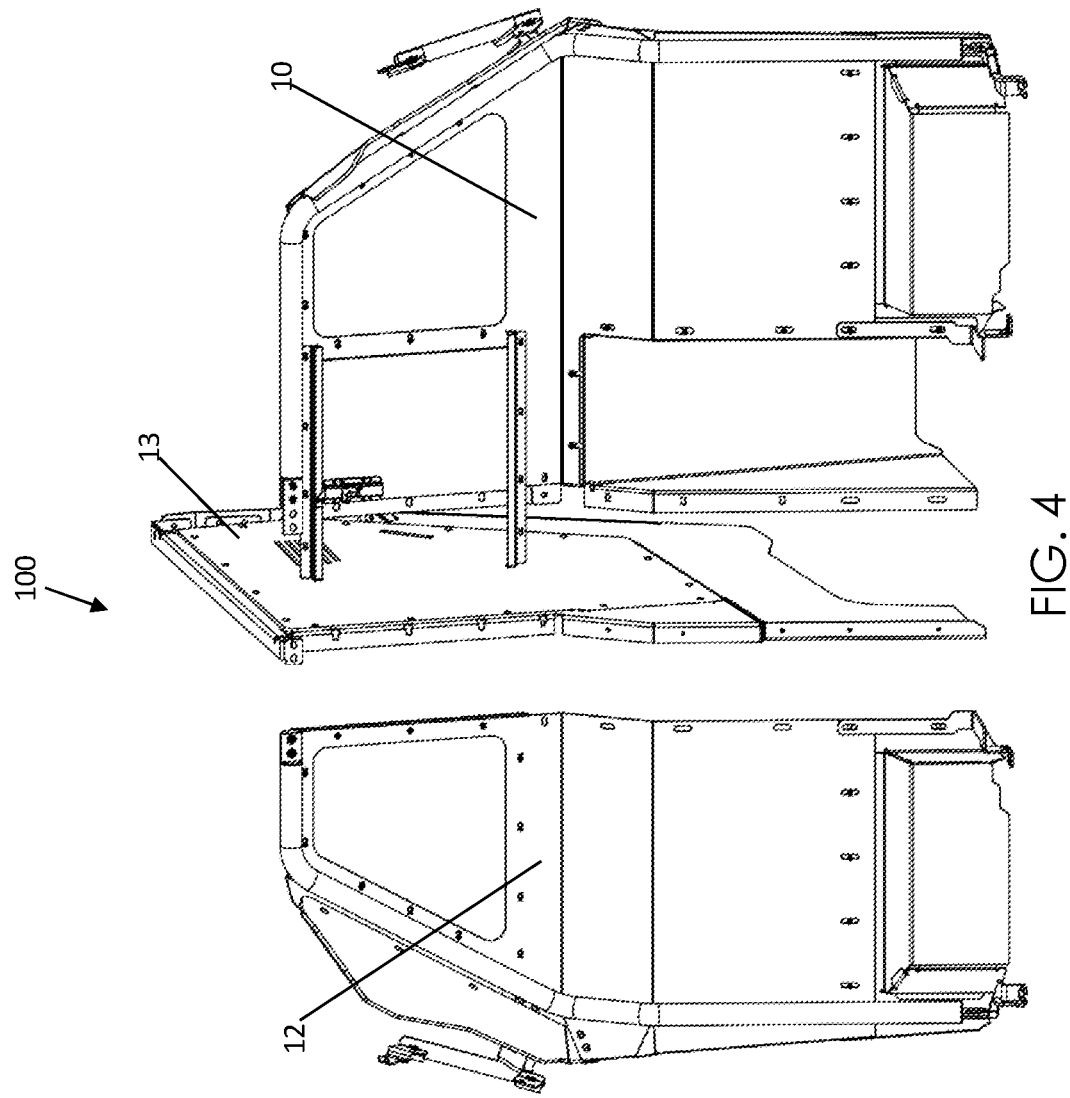
FIG. 4 shows an exploded view of the partition shown in FIG. 3.
Figure 5:
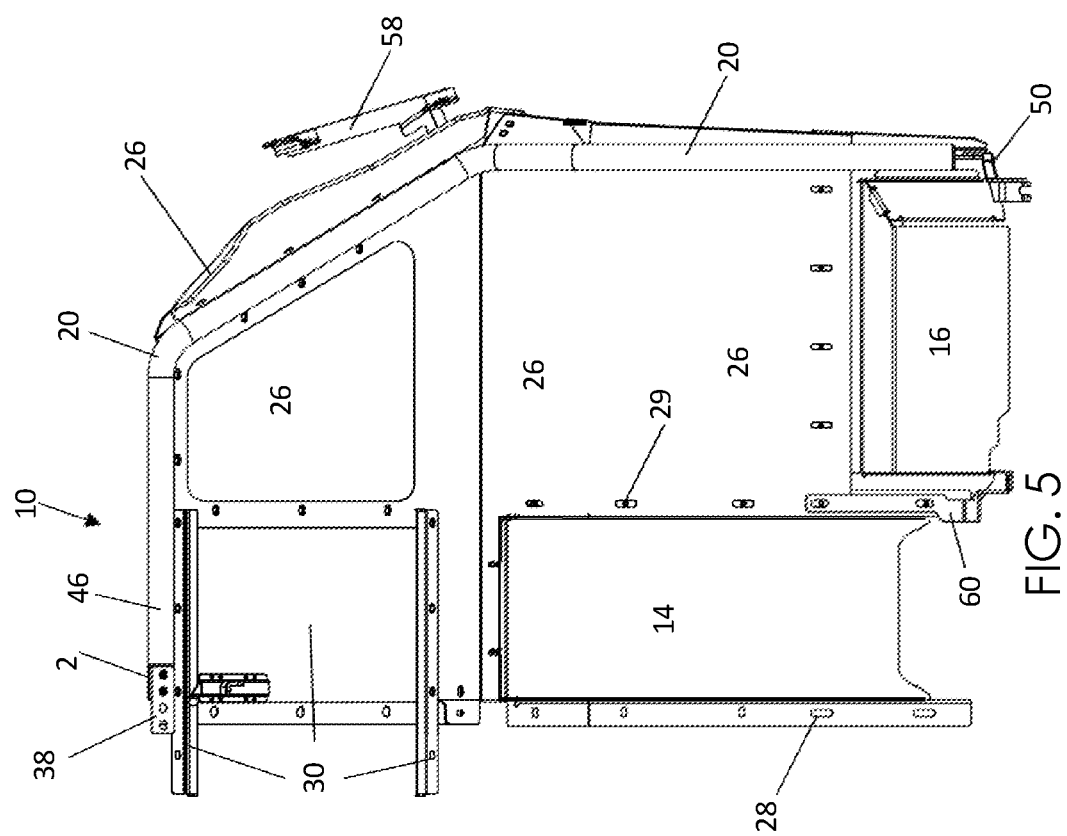
FIG. 5 shows a front view of the driver assembly of the partition of FIG. 1.
Figure 6:
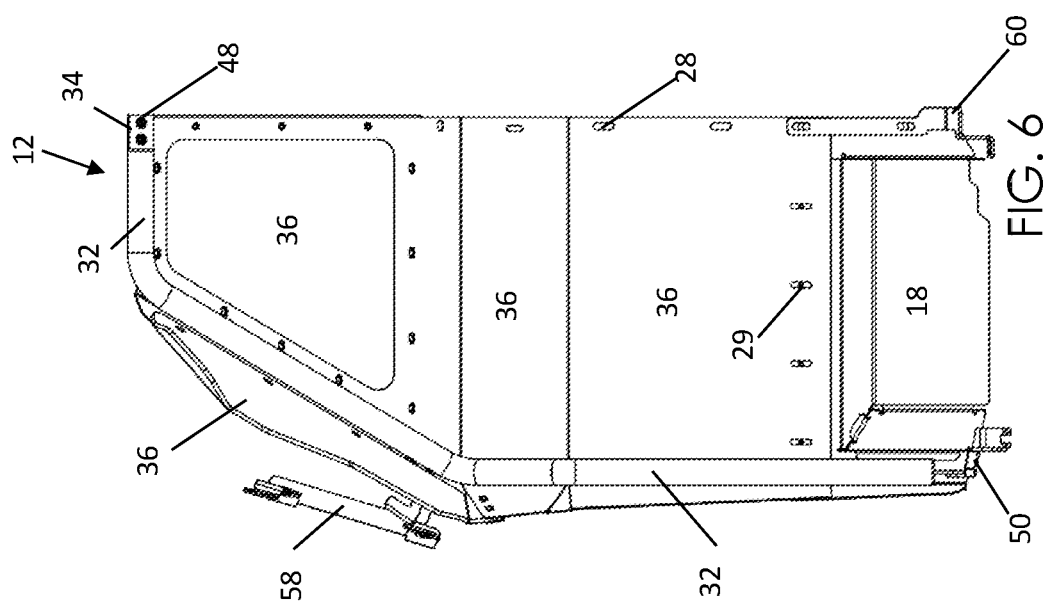
FIG. 6 shows a front view of the passenger assembly of the partition of FIG. 1.

Referring to FIGS. 1-16, the present invention provides a security partition 100 that can be shipped in collapsible manner (which significantly reduces shipping costs) by separating the security partition 100 into at least two structural assemblies for shipping and storage purposes. The at least two structural assemblies include a driver assembly 10 as shown in FIG. 5; a passenger assembly 12 as shown in FIG. 6; an optional passenger divider 13 as shown in FIGS. 3-4 to divide and separate the rear passenger area into two sections: a passenger rear section behind the passenger assembly 12 and a driver rear section behind the drive assembly 10. The passenger divider 13 can be attached to either the passenger assembly 12 as shown in FIGS. 3-4, or alternatively to the driver assembly 10.

Referring to FIG. 5, the driver assembly 10 includes a driver frame member 20 having a driver connect feature 22 that is a part of the frame connect assembly 24, at least one or more driver panels 26. Some of the driver panel(s) 26 have assembly attachment features 28 (e.g., through holes or other suitable art-disclosed attachment means) designed for use with art-closed fasteners 29 to attach such panel(s) 26 to the passenger assembly 12. Moreover, the driver panel(s) 26 may optionally include a center panel 14, a driver foot panel 16, and/or a window assembly 30 as shown in FIG. 5. The window assembly 30 allows opening/passage between the front occupant area to the rear occupant area of the vehicle. The center panel 14 may alternatively be part of the passenger panel(s) 36. Moreover, the center panel 14 may optionally be shipped as a separate piece that are then attached to both the driver assembly 10 and the passenger assembly 12 during the post-delivery assembly. Similarly, the driver foot panel 16 may optionally be shipped as a separate piece that is then attached to the driver assembly 10 during the post-delivery assembly.

Referring to FIG. 6, the passenger assembly 12 includes a passenger frame member 32 having a passenger connect feature 34 that is a part of the frame connect assembly 24, and at least one or more passenger panel(s) 36. Some of the passenger panel(s) 36 have assembly attachment features 28 (e.g., through holes or other suitable art-disclosed attachment means) designed for use with the fasteners 29 to attach such panels 36 to the driver assembly 10. Moreover, the passenger panel(s) 36 may optionally include the center panel 14, a passenger foot panel 18, and/or the window assembly 30. The passenger foot panel 18 may optionally be shipped as a separate piece that is then attached to the passenger assembly 12 during the post-delivery assembly.

Both the driver panel(s) 26 and the passenger panel(s) 36 can be constructed using various materials such as metal, plastic or other polymeric materials, glass, etc. For example, some of the panel(s) (26, 36) are constructed out of plastic (e.g., Plexiglass or the like) while other panel(s) (26, 36) are constructed out of metal.

Figure 7:
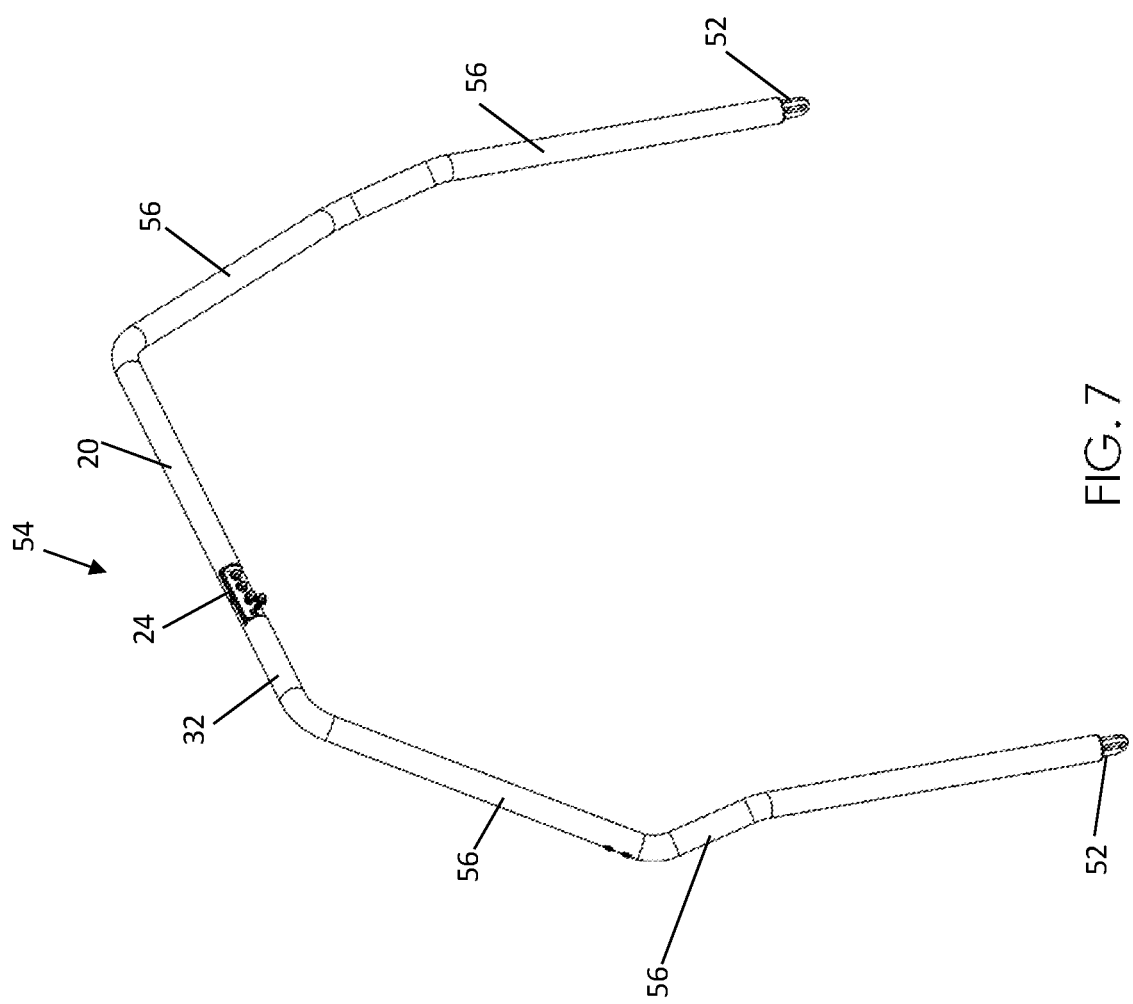
FIG. 7 shows a front perspective view of the frame structure of the partition of FIG. 1.
Figure 8:
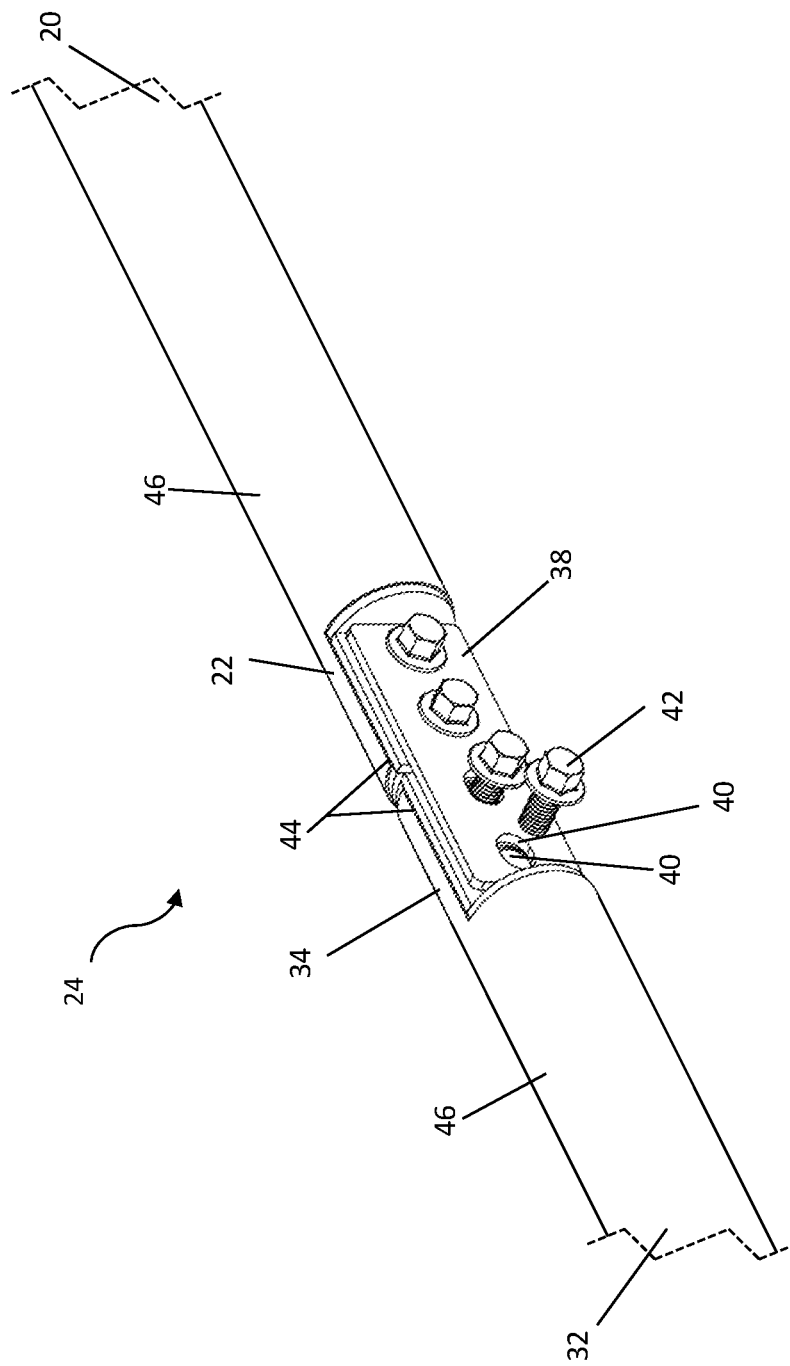
FIG. 8 shows a front perspective view of a portion of the frame structure shown in FIG. 7 containing the frame connect assembly.

Referring to FIGS. 7-8, which is a close-up view of one exemplary embodiment of the frame connect assembly 24 of the security partition 100, the frame connect assembly 24 includes the driver connect feature 22, the passenger connect feature 34, and a connector 38 (e.g., a plate, a sleeve, a clamp, or the like) all having assembly attachment features 40 (e.g., through holes or the like) designed to accept fasteners 42 (e.g., art-disclosed fasteners such as bolts, bolts and nuts, or the like). The driver connect feature 22 and the passenger connect feature 34 both have cut out features 44 (e.g., depressions) that allow the connector 38 to be placed within these features 44 without protruding out of the non-feature portions 46 of the driver frame member 20 and the passenger frame member 32. The non-feature portions 46 are the portions of the driver frame member 20 and the passenger frame member 32 that are not part of the frame connect assembly 24.

Figure 1:
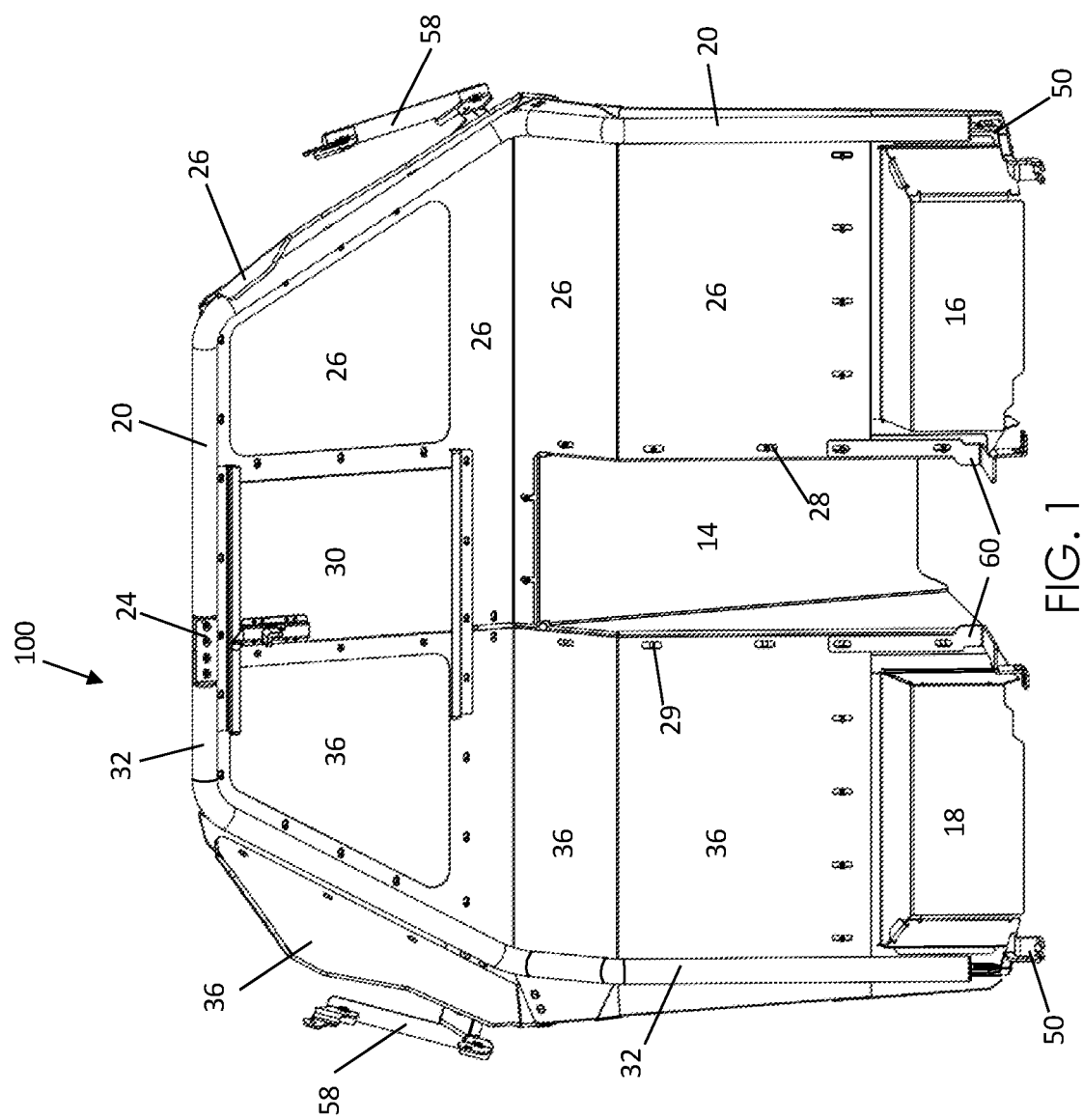
FIG. 1 shows a front perspective view of a fully assembled modular security partition in accordance with the principals of the present invention.
Figure 2:
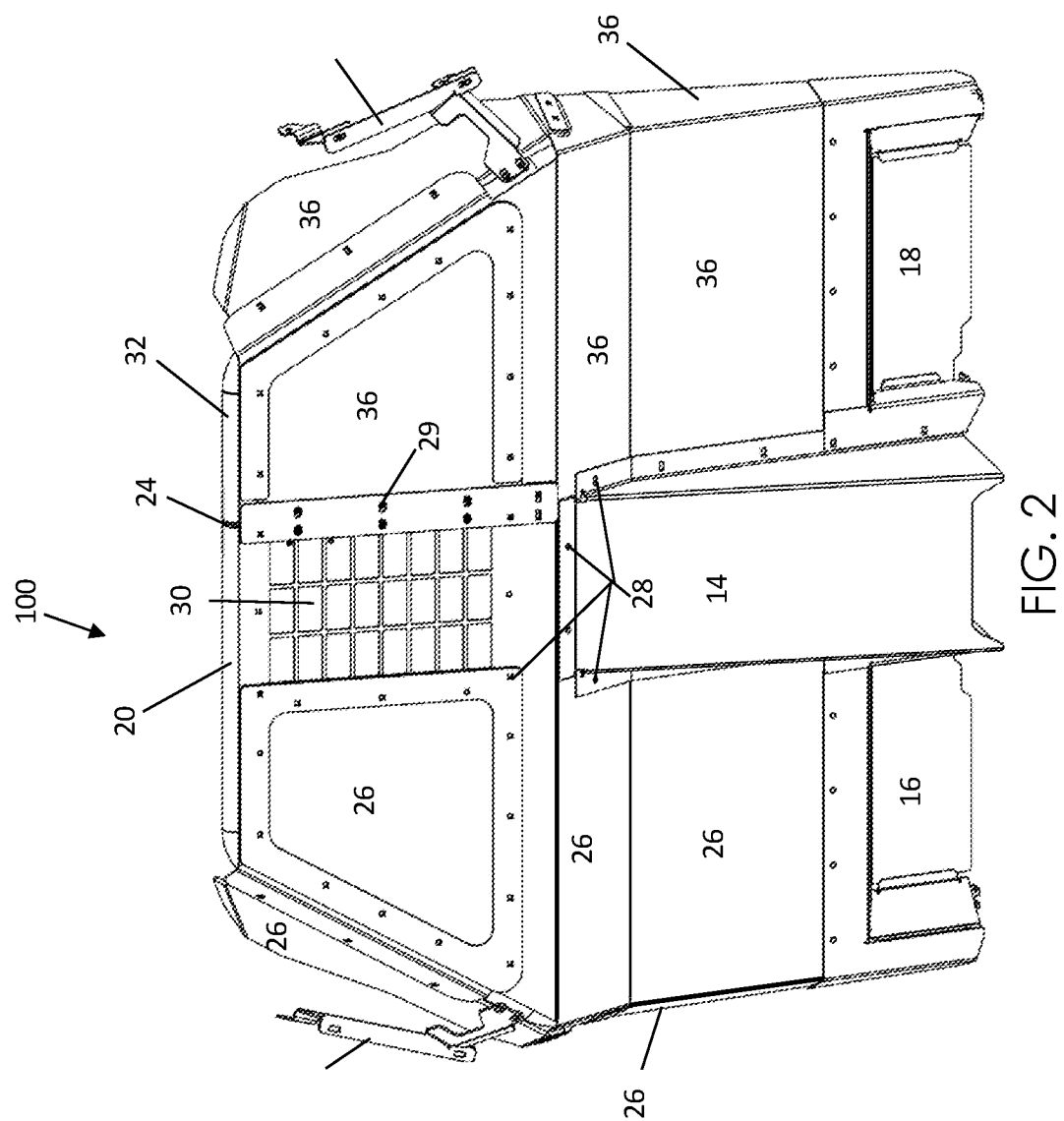
FIG. 2 shows a rear perspective view of the partition of FIG. 1.

During the post-delivery assembly, the driver assembly 10 and the passenger assembly 12 are connected together by the frame connect assembly 24 and the attachments between the relevant driver and passenger panel(s) (26, 36) using the assembly attachment features (28, 40) and the fasteners (29, 42), thereby forming the security partition 100 as shown in FIGS. 1-2. The frame connect assembly 24 connects the driver assembly 10 and the passenger assembly 12 by placing the connector 38 into the cut out features 44 of driver connect feature 22 and the passenger connect feature 34 as shown in FIG. 7. Thereafter, the fasteners 42 are used with the assembly attachment features 40 and the connector 38 to attach the connector 38, the driver connect feature 22 and the passenger connect feature 34 as shown in FIG. 7.

Figure 9:
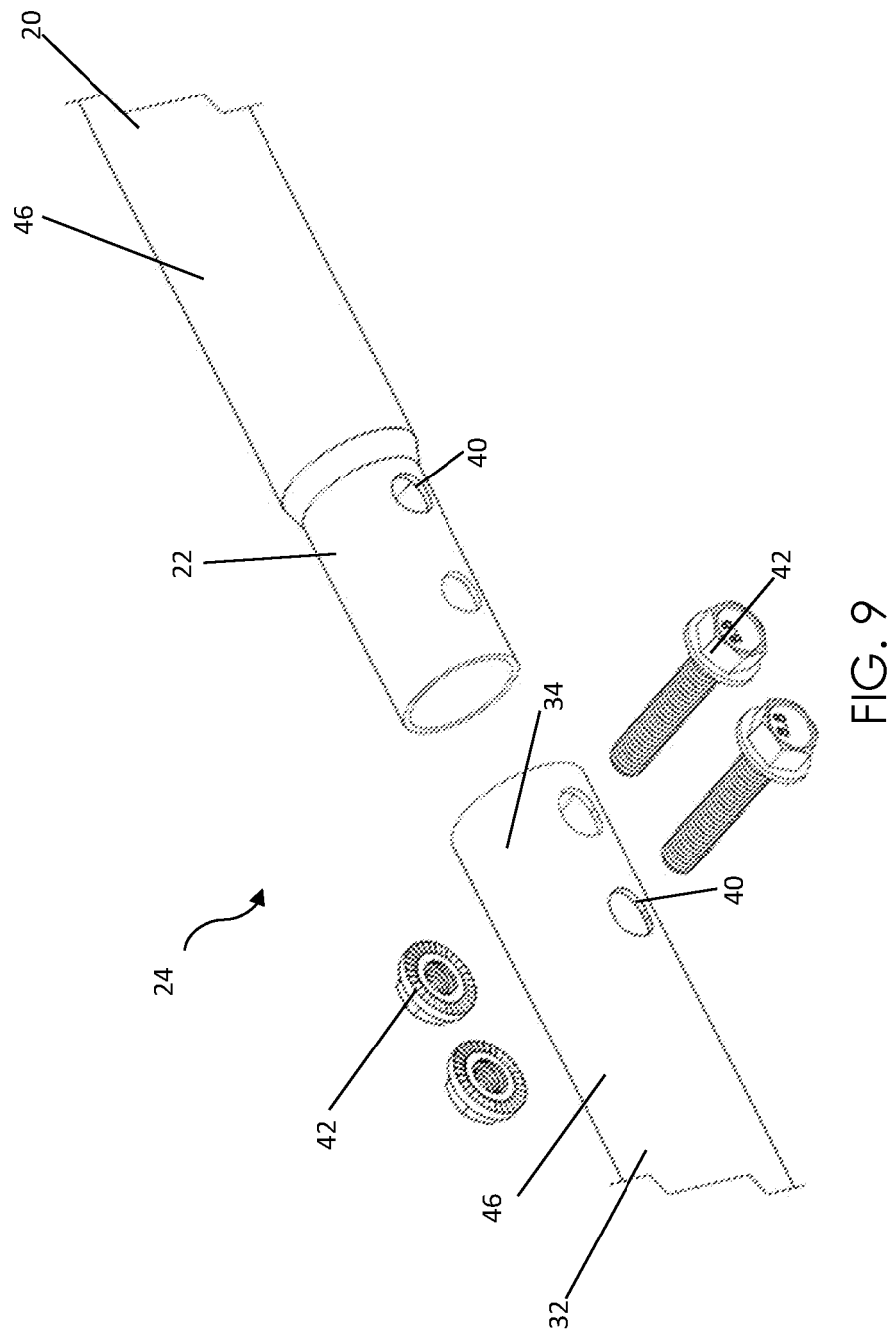
FIG. 9 shows a front perspective view of a portion of the frame structure shown in FIG. 7 containing a second embodiment of the frame connect assembly.

Other exemplary embodiments of the frame connect assembly 24 are shown in FIGS. 9-16. In the embodiments of the frame connect assembly 24 shown in FIGS. 9-10 and 12-14, there is no connector 38. Instead, the driver connect feature 22 is directly attached to the passenger connect feature 34 and secured by the fasteners 42. FIG. 9 shows the driver connect feature 22 is a tube that is designed to slide and fit into the passenger connect feature 34 which is another tube having a diameter that is greater than the diameter of the driver connect feature 22. In another embodiment, the driver connect feature 22 has a diameter that is greater than the diameter of the passenger connect feature 34.

Figure 10:
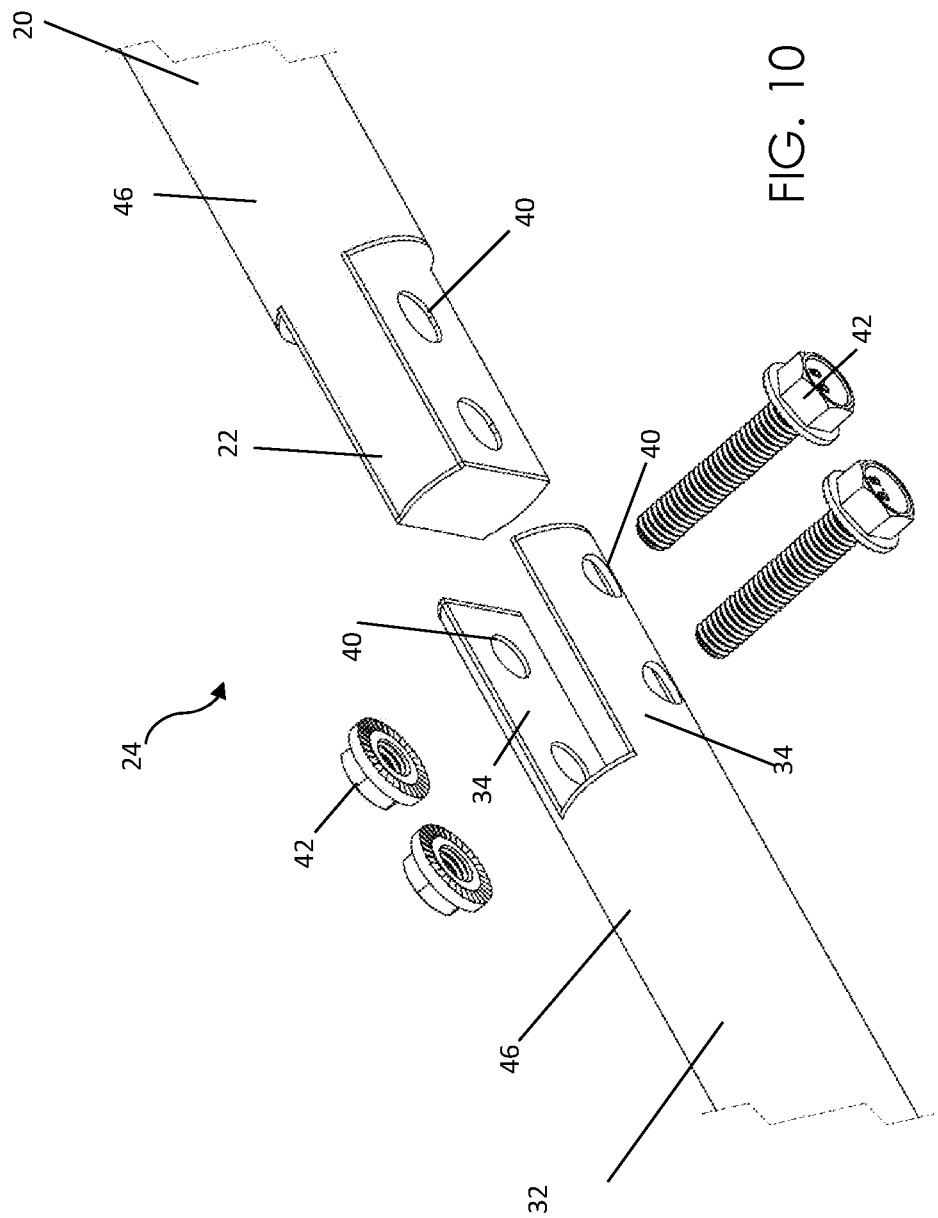
FIG. 10 shows a front perspective view of a portion of the frame structure shown in FIG. 7 containing a third embodiment of the frame connect assembly.
Figure 11:
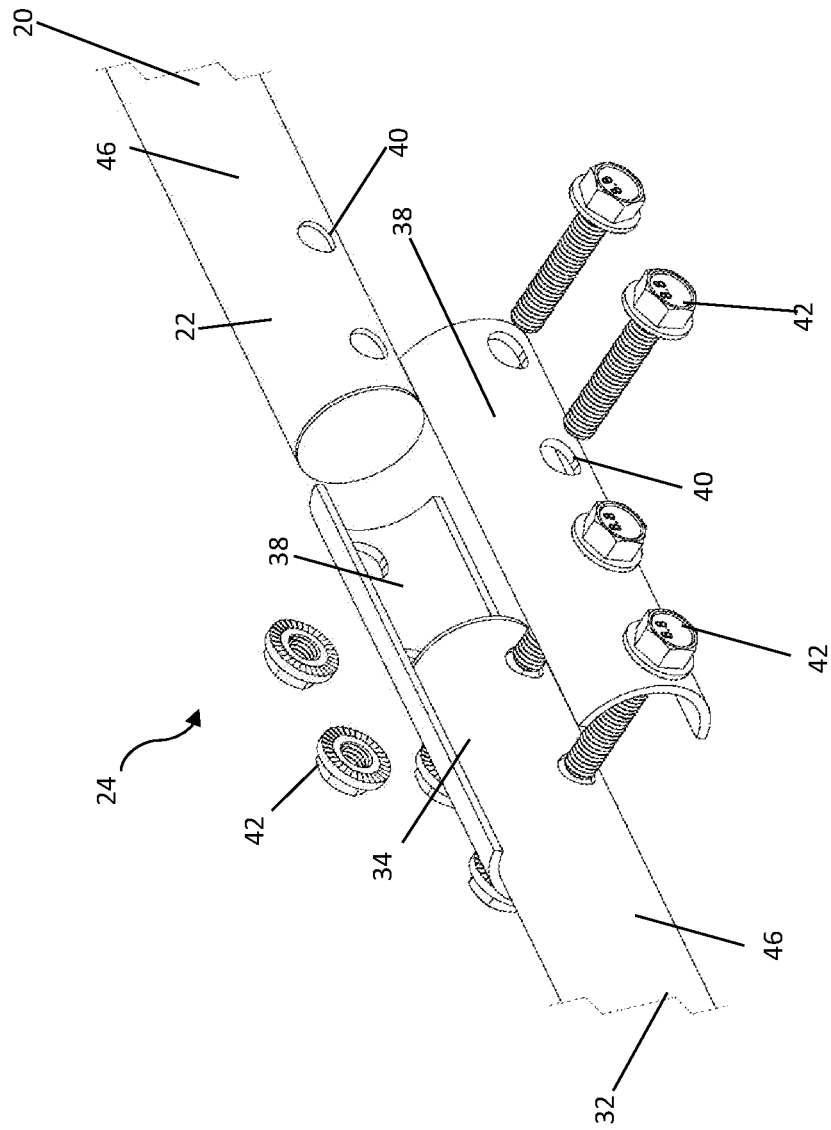
FIG. 11 shows a front perspective view of a portion of the frame structure shown in FIG. 7 containing a fourth embodiment of the frame connect assembly.

FIG. 10 shows the driver connect feature 22 slides and fits into the passenger connect feature 34 of a slot. In another embodiment, the driver connect feature 22 is the slot and the passenger connect feature 34 is designed to slide and fit into this slot.

Figure 12:
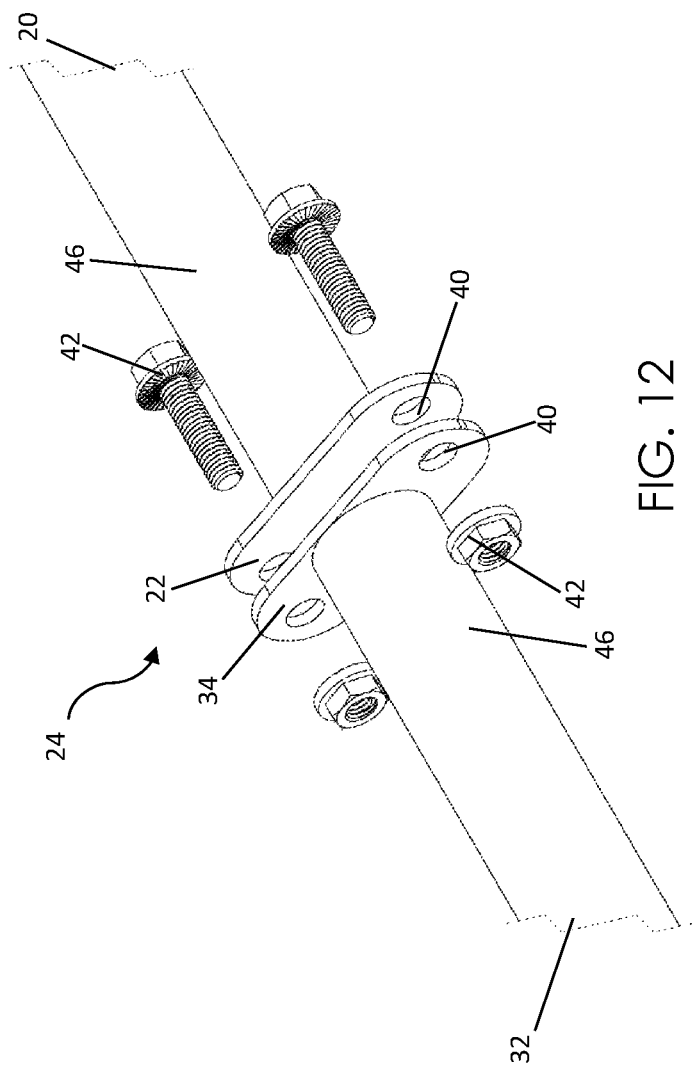
FIG. 12 shows a front perspective view of a portion of the frame structure shown in FIG. 7 containing a fifth embodiment of the frame connect assembly.

FIG. 12 shows the driver connect feature 22 and the passenger connect feature 34 are flanges.

Figure 13:
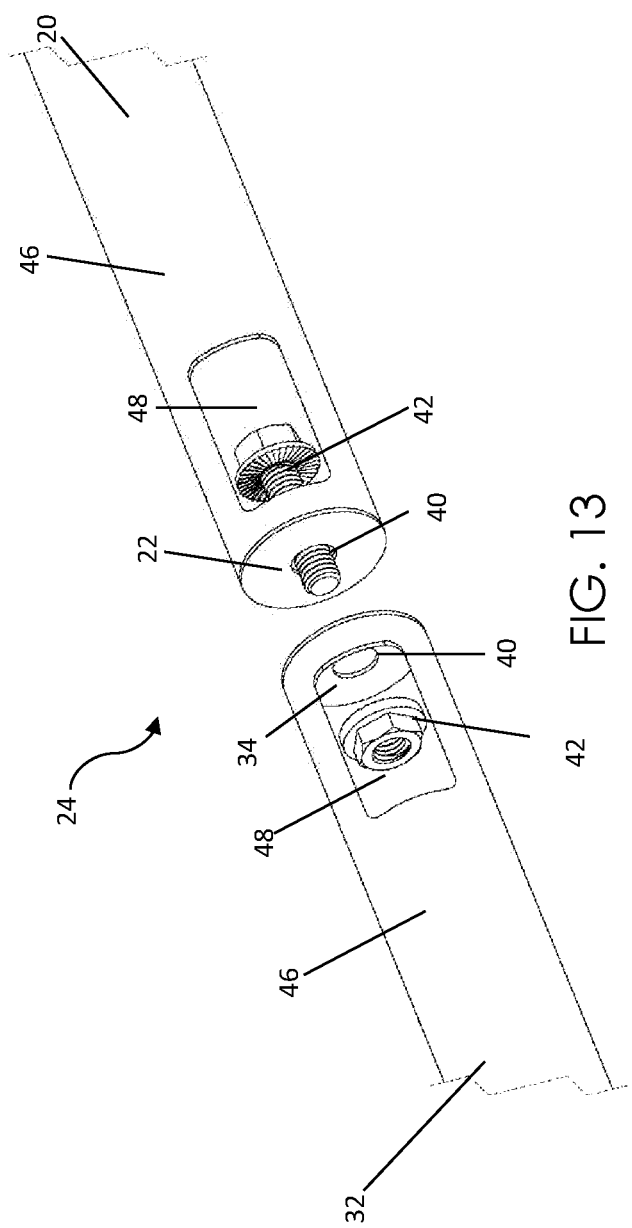
FIG. 13 shows a front perspective view of a portion of the frame structure shown in FIG. 7 containing a sixth embodiment of the frame connect assembly.

FIG. 13 shows the driver connect feature 22 and the passenger connect feature 34 are cylinders ending with the frame attachment feature 40 (e.g., through holes) for attachment with the fastener 42, and an access feature 48 for accessing the fastener 42 during assembly.

Figure 14:
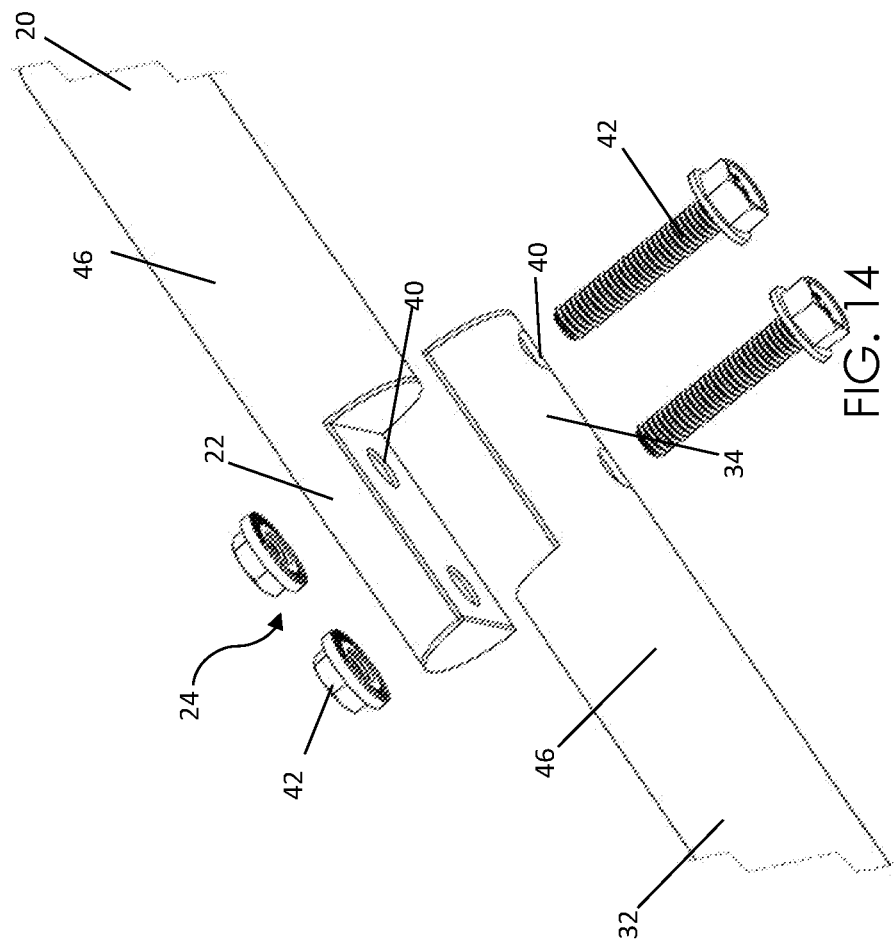
FIG. 14 shows a front perspective view of a portion of the frame structure shown in FIG. 7 containing a seventh embodiment of the frame connect assembly.
Figure 15:
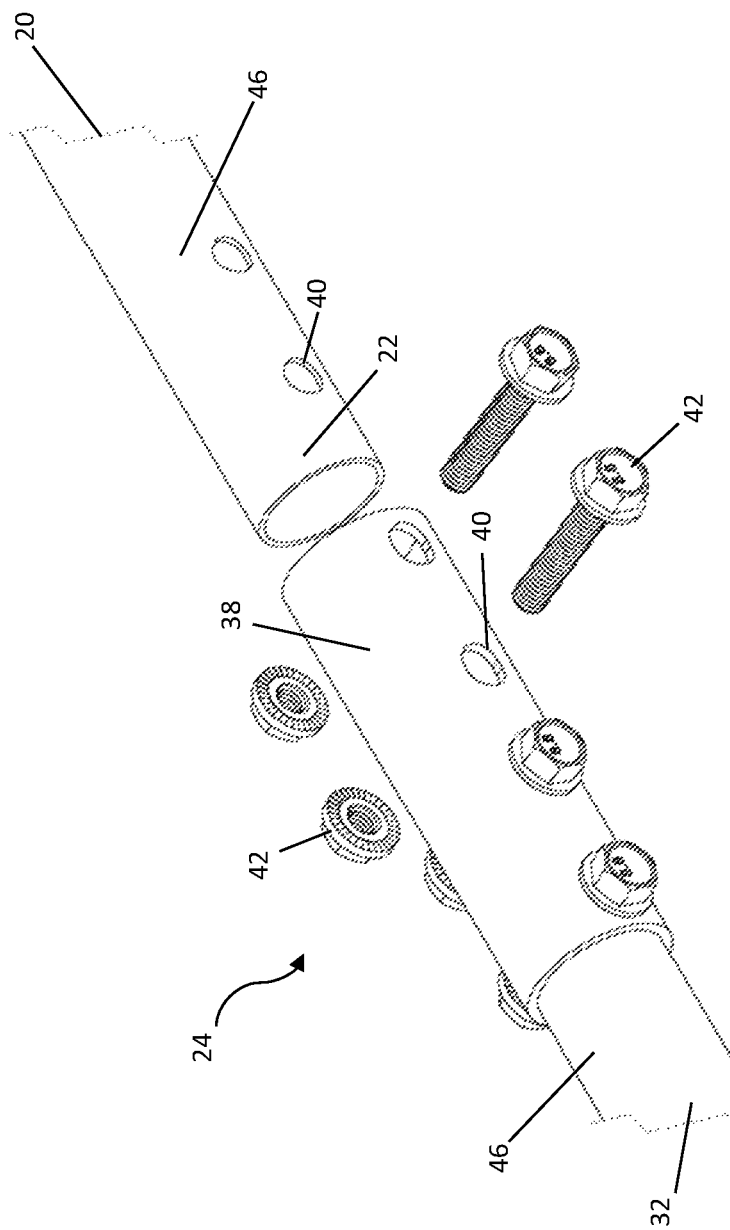
FIG. 15 shows a front perspective view of a portion of the frame structure shown in FIG. 7 containing an eighth embodiment of the frame connect assembly.
Figure 16:
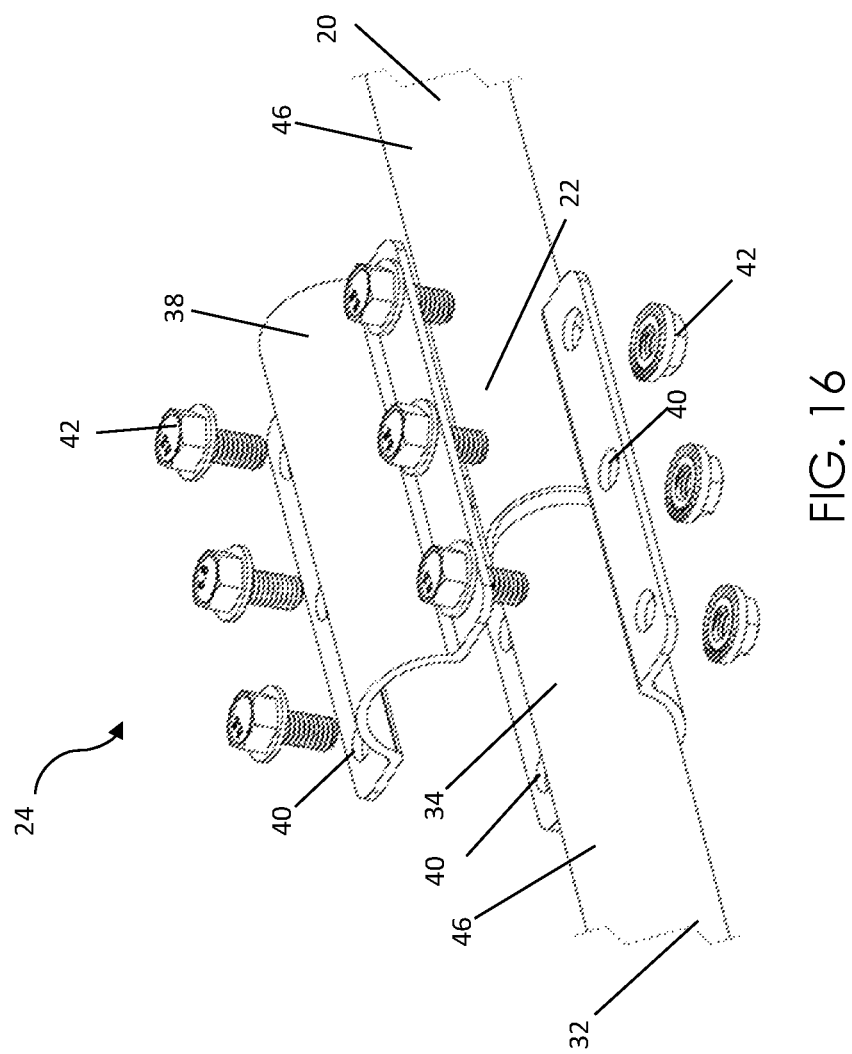
FIG. 16 shows a front perspective view of a portion of the frame structure shown in FIG. 7 containing a ninth embodiment of the frame connect assembly.

FIG. 14 shows that the driver connect feature 22 and the passenger connect feature 34 are designed to couple and attach together to form a cylindrical shape. In other embodiments of the frame connect assembly 24, the connector 38 is a clamp (FIGS. 11 and 16) or a sleeve (FIG. 15) that attaches the driver connect feature 22 to the passenger connect feature 34. The sleeve shown in FIG. 15 can be any shape including a cylindrical shape conforming to the tubular shape of the driver frame member 20 and the passenger frame member 32.

It should be noted that the present invention further includes embodiments of the frame connect assembly 24 using other art-disclosed connection means to removably connect the passenger frame member 32 and the driver frame member 20 together during the installation of the security partition 100 into a vehicle.

It is optional but preferred that an art-disclosed pivotable mounting assembly 50 (see e.g., U.S. Patent Application Pub. No. 20190023211) for which a pivotable mounting feature 52 is includes in both the driver assembly 10 and in the passenger assembly 12 for easy installation into a vehicle. The security partition 100 is installed in a location between the front occupant area and the rear occupant area of the vehicle in order to form a complete physical barrier between these areas. It is optional that the security partition 100 extends from side to side and ceiling to floor of the vehicle conforming to the configuration inside the bulkhead of the vehicle, thereby forming a complete physical barrier between the front occupant area and the rear occupant area. Referring to FIG. 7, the driver frame member 20 and the passenger frame member 32 when connected via the frame connect assembly 24 forms a frame structure 54 that conforms to the general width of interior of the vehicle.

In one exemplary embodiment, the drive frame member 20 and the passenger frame member 32 are each from a tubular steel and/or aluminum bent and/or welded into the desired shape(s). FIG. 7 shows an exemplary embodiment of the frame structure 54 wherein the drive frame member 20 and the passenger frame member 32 are each constructed out of tubular steel sections 56 welded together to form the desired shapes.

A protective sleeve is optionally provided to cover one or more portions of the frame structure 54 in order to protect the occupants of the vehicle. The protective sleeve can be constructed of any suitable art-disclosed material such as plastic, rubber, or other polymeric material.

Referring to FIGS. 1-3, both the driver frame member 20 and the passenger frame member 32 include a side mounting bracket 58 that secures the partition 100 to the two sides of the vehicle using conventional fasteners such as threaded bolts or the like. It is optional that the side mounting apertures of the brackets match or correspond to the apertures already available on the sides of the vehicle in order to avoid further aperture drillings. Moreover, both the driver fame member 20 and the passenger frame member 32 include bottom mounting brackets 60 that secure the partition 100 to the bottom of the vehicle using conventional fasteners such as threaded bolts or the like.

The above-described components of the security partition 100 may be constructed out of any suitable art-disclosed material. Examples of such material are polycarbonate and other polymeric material, steel including but are not limited to stainless steel, cold rolled steel, mild steel, high strength steel, tempered steel, aluminum, and other metal alloys. The thickness of each individual component may vary. Examples of suitable thickness are in the range from about $\frac{1}{16}$" to about $\frac{1}{2}$" and from about 1 mm to about 6 mm. The exact size and shape of the security partition 100 will vary depending on the configuration of the vehicle.

The present invention further includes a method to package the security partition 100 by providing the driver assembly 10 and the passenger assembly 12 as separate pieces wherein during post-delivery assembly, the driver assembly 10 and the passenger assembly 12 are connected together by the frame connect assembly 24 and the attachments between the relevant driver panel(s) 26 and passenger panel(s) 36 using the assembly attachment features 28 and the fasteners 29, resulting in the fully assembled security partition 100.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

What is claimed is:

1. A security partition for a public safety vehicle comprising: a driver assembly, a passenger assembly, and a frame connect assembly, wherein
    the driver assembly having at least one driver panel having assembly attachment features, and a driver frame member having a non-feature portion, and a driver connect feature that is a part of the frame connect assembly;
    the passenger assembly having at least one passenger panel having assembly attachment features, and a passenger frame member having a non-feature portion, and a passenger connect feature that is a part of the frame connect assembly;
    the driver frame member and the passenger frame member are separate structural members that can be connected together via the frame connect assembly during post-delivery assembly of the security partition into the public safety vehicle;
    the driver assembly and the passenger assembly are separate pieces designed for easy shipping in a collapsible manner;
    after the easy shipping and during the post-delivery assembly of the security partition, the driver assembly and the passenger assembly are then assembled together into the security partition as a single piece by using the frame connect assembly, fasteners, the assembly attachment features of the at least one driver panel, and the assembly attachment features of the at least one passenger panel; and
    the driver connect feature is an open tube having a first diameter and the passenger connect feature is an open tube having a second diameter; difference between the first diameter and the second diameter allows the driver connect feature and the passenger connect feature to slide and fit together.

2. A security partition for a public safety vehicle comprising: a driver assembly, a passenger assembly, and a frame connect assembly, wherein
    the driver assembly having at least one driver panel having assembly attachment features, and a driver frame member having a non-feature portion, and a driver connect feature that is a part of the frame connect assembly;
    the passenger assembly having at least one passenger panel having assembly attachment features, and a passsenger frame member having a non-feature portion, and a passenger connect feature that is a part of the frame connect assembly;
    the driver frame member and the passenger frame member are separate structural members that can be connected together via the frame connect assembly during post-delivery assembly of the security partition into the public safety vehicle;
    the driver assembly and the passenger assembly are separate pieces designed for easy shipping in a collapsible manner;
    after the easy shipping and during the post-delivery assembly of the security partition, the driver assembly and the passenger assembly are then assembled together into the security partition as a single piece by using the frame connect assembly, fasteners, the assembly attachment features of the at least one driver panel, and the assembly attachment features of the at least one passenger panel; and
    the driver connect feature and the passenger connect feature are both flanges designed to be attached together using the fasteners.

3. The security partition of claim 1 wherein each of the driver connect feature and the passenger connect feature includes
    an end having an assembly attachment feature for attachment using at least one of the fasteners; and
    an access feature for accessing the at least one of the fasteners during assembly.

4. The security partition of claim 1 wherein each of the driver assembly and the passenger assembly includes a pivotable mounting feature that provides easier installation of the security partition into the vehicle.

5. The security partition of claim 1 wherein the driver connect feature includes at least one of the assembly attachment features and the passenger connect feature includes at least one of the assembly attachment features.

6. The security partition of claim 5 wherein the driver connect feature and the passenger connect feature are designed to fit together and attach using at least one of the fasteners and the assembly attachment features.

7. A security partition for a public safety vehicle comprising: a driver assembly, a passenger assembly, and a frame connect assembly, wherein
    the driver assembly having at least one driver panel having assembly attachment features, and a driver frame member having a non-feature portion, and a driver connect feature that is a part of the frame connect assembly;
    the passenger assembly having at least one passenger panel having assembly attachment features, and a passenger frame member having a non-feature portion, and a passenger connect feature that is a part of the frame connect assembly;
    the driver assembly and the passenger assembly are separate pieces designed for easy shipping;
    the driver assembly and the passenger assembly are then assembled together into the security partition as a single piece by using the frame connect assembly, fasteners, the assembly attachment features of the at least one driver panel, and the assembly attachment features of the at least one passenger panel;
    the frame connect assembly further includes a connector that facilitates attachment of the driver connect feature and the passenger connect feature wherein the connector is a clamp or a plate.

8. The security partition of claim 7 wherein the driver connect feature, the passenger connect feature, and the connector all include assembly attachment features designed to accept at least one of the fasteners.

9. The security partition of claim 7 wherein the connector is a plate.

10. The security partition of claim 7 wherein the connector is a clamp.

11. The security partition of claim 7 wherein each of the driver connect feature and the passenger connect feature includes cut out features that allow the connector to be placed within the cut out features without protruding beyond the non-feature portion of the driver frame member or the non-feature portion of the passenger frame member.

12. The security partition of claim 7 wherein each of the driver assembly and the passenger assembly includes a pivotable mounting feature that provides easier installation of the security partition into the vehicle.

13. A method to package a security partition comprising:
providing a security partition comprising: a driver assembly, a passenger assembly, and a frame connect assembly, wherein
the driver assembly having at least one driver panel having assembly attachment features, and a driver frame member having a non-feature portion, and a driver connect feature that is a part of the frame connect assembly;
the passenger assembly having at least one passenger panel having the assembly attachment features, and a passenger frame member having a non-feature portion, and a passenger connect feature that is a part of the frame connect assembly;
the driver frame member and the passenger member are separate structural members that can be connected together via the frame connect assembly during post-delivery assembly of the security partition into the public safety vehicle; the driver assembly and the passenger assembly are packaged as separate pieces designed for easy shipping in a collapsible manner; and
during the post-delivery assembly, the driver assembly and the passenger assembly are separately placed into the vehicle and assembled together into the security partition as a single piece by using the frame connect assembly, fasteners, and the assembly attachment features of the at least one driver panel and the assembly attachment features of the at least one passenger panel; and
the frame connect assembly further includes a connector that facilitates the attachment of the driver connect feature and the passenger connect feature wherein the connector is either a plate or a clamp.

14. The method of claim 13 wherein the driver connect feature, the passenger connect feature, and the connector all include assembly attachment features designed to accept at least one of the fasteners.

15. The method of claim 13 wherein each of the driver assembly and the passenger assembly includes a pivotable mounting feature that provides easier installation of the security partition into the vehicle.

16. The security partition of claim 2 wherein each of the driver assembly and the passenger assembly includes a pivotable mounting feature that provides easier installation of the security partition into the vehicle.

17. The security partition of claim 2 wherein the driver connect feature includes at least one of the assembly attachment features and the passenger connect feature includes at least one of the assembly attachment features.

18. The security partition of claim 17 wherein the driver connect feature and the passenger connect feature are designed to fit together and attached using at least one of the fasteners and the assembly attachment features.

* * * * *